(12) United States Patent
Brandsma

(10) Patent No.: US 10,883,567 B2
(45) Date of Patent: Jan. 5, 2021

(54) TRANSVERSE MEMBER FOR A DRIVE BELT FOR A CONTINUOUSLY VARIABLE TRANSMISSION

(71) Applicant: ROBERT BOSCH GMBH, Stuttgart (DE)

(72) Inventor: Arjen Brandsma, Tilburg (NL)

(73) Assignee: ROBERT BOSCH GMBH, Stuttgart (DE)

( * ) Notice: Subject to any disclaimer, the term of this patent is extended or adjusted under 35 U.S.C. 154(b) by 280 days.

(21) Appl. No.: 16/065,580

(22) PCT Filed: Dec. 22, 2016

(86) PCT No.: PCT/EP2016/025190
§ 371 (c)(1),
(2) Date: Jun. 22, 2018

(87) PCT Pub. No.: WO2017/108207
PCT Pub. Date: Jun. 29, 2017

(65) Prior Publication Data
US 2019/0032750 A1 Jan. 31, 2019

(30) Foreign Application Priority Data

Dec. 22, 2015 (NL) .......................................... 1041639

(51) Int. Cl.
*F16G 5/16* (2006.01)

(52) U.S. Cl.
CPC ...................................... *F16G 5/16* (2013.01)

(58) Field of Classification Search
CPC . F16G 5/16; F16G 5/163; F16G 5/166; F16H 9/125; F16H 9/24
(Continued)

(56) References Cited

U.S. PATENT DOCUMENTS 4,689,038 A * 8/1987 Henderson .............. F16G 5/166
474/242
4,698,050 A * 10/1987 Hattori ...................... F16G 5/16
474/201

(Continued)

FOREIGN PATENT DOCUMENTS

EP 0367620 5/1990
EP 0896171 2/1999

(Continued)

OTHER PUBLICATIONS

International Search Report, PCTEP2016/025190, dated Apr. 12, 2017.

*Primary Examiner* — Henry Y Liu
(74) *Attorney, Agent, or Firm* — Nixon & Vanderhye

(57) ABSTRACT

A transverse member (1) for a drive belt for a continuously variable transmission with a base part (10) and two pillar parts (11). On either side thereof, the transverse member is provided with a pulley contact surface (12) for contacting pulleys of the transmission. The pulley contact surfaces (12) are each provided in two sections (13, 14) with a surface part (15) of the transverse member (1) provided there between that does not arrive in contact with the transmission pulleys, whereof a first section (13) is provided at least partly in the base part (10) and whereof a second section (14) is wholly provided in a respective pillar part (11).

7 Claims, 2 Drawing Sheets

(58) Field of Classification Search
USPC .......................................................... 474/242
See application file for complete search history.

(56) References Cited

U.S. PATENT DOCUMENTS

| | | | | |
|---|---|---|---|---|
| 4,718,881 | A * | 1/1988 | Sugimoto | F16G 5/18 474/242 |
| 4,915,677 | A * | 4/1990 | Simon | F16G 5/16 474/242 |
| 5,004,450 | A * | 4/1991 | Ide | F16G 5/16 474/242 |
| 5,931,756 | A * | 8/1999 | Ohsono | F16H 9/125 474/167 |
| 6,306,055 | B1 * | 10/2001 | Serkh | F16G 5/166 474/242 |
| 6,440,024 | B1 * | 8/2002 | Kobayashi | F16G 5/16 474/242 |
| 6,672,984 | B2 * | 1/2004 | Yagasaki | F16G 5/16 474/201 |
| 6,705,963 | B2 | 3/2004 | Smeets et al. | |
| 6,830,525 | B1 * | 12/2004 | Brandsma | F16G 5/163 474/201 |
| 7,066,858 | B2 * | 6/2006 | Smeets | F16G 5/16 474/201 |
| 7,951,032 | B2 * | 5/2011 | Yagasaki | F16H 55/38 474/242 |
| 8,104,159 | B2 * | 1/2012 | Hattori | F16G 5/16 29/407.01 |
| 8,272,984 | B2 * | 9/2012 | Kato | F16G 5/16 474/242 |
| 8,449,418 | B2 * | 5/2013 | Sakanaka | F16G 5/166 474/242 |
| 8,647,223 | B2 * | 2/2014 | Kuwabara | F16G 5/16 474/242 |
| 8,814,735 | B2 * | 8/2014 | Toyohara | F16G 5/16 474/242 |
| 2002/0137585 | A1 * | 9/2002 | Smeets | F16G 5/163 474/242 |
| 2007/0072721 | A1 * | 3/2007 | Takagi | F16G 5/16 474/242 |
| 2008/0274848 | A1 * | 11/2008 | Van Der Leest | F16H 9/24 474/201 |
| 2011/0300980 | A1 * | 12/2011 | Kuwabara | F16G 5/16 474/242 |
| 2019/0346016 | A1 * | 11/2019 | Van Treijen | F16G 5/16 |

FOREIGN PATENT DOCUMENTS

| | | |
|---|---|---|
| EP | 1219860 | 7/2002 |
| JP | 2009-185944 | 8/2009 |
| JP | 2009-185945 | 8/2009 |

* cited by examiner

TRANSVERSE MEMBER FOR A DRIVE BELT FOR A CONTINUOUSLY VARIABLE TRANSMISSION

BACKGROUND OF THE INVENTION

The present disclosure relates to a transverse member of a drive belt for a continuously variable transmission with two pulleys for accommodating the drive belt between the, at least partly conical pulley sheaves thereof. The known drive belt comprises an endless, i.e. ring-shaped carrier that is composed of at least one, but typically of a set of nested, flexible rings and a number of the transverse members that together form a row along the circumference of the endless carrier. Typically both the said flexible rings and the transverse members of the drive belt are made of metal, in particular steel. Typically also, a thickness of the transverse member is small relative to the circumference length of the endless carrier such that several hundred transverse members are comprised by a single drive belt.

The transverse members each include a predominantly widthwise, i.e. axially relative to the drive belt's circumference direction, extending base part with an, at least effectively, trapezoidal outline and two pillar parts that extend from a respective axial side of the base part in a direction essentially perpendicular to the aforementioned axial and circumference directions of the drive belt, i.e. in the radial direction in a curved section of the drive belt. Each transverse member thus defines a centrally located opening between the pillar parts and the base part thereof, wherein a small circumferential section—corresponding to the thickness of the transverse member—of the endless carrier is accommodated. Such a drive belt with effectively V-shaped transverse members is known from, for example, the European patent publication No. EP-1219860-A, in particular FIG. 6 thereof.

In the base part of the known transverse members, on a front main surface thereof, a so-called tilting zone is provided. The tilting zone is an axially extending transition between a radially outer section of the transverse member of essentially constant thickness, i.e. dimension in the said circumferential direction, and a radially inner section thereof that, at least effectively, tapers in radial inward direction. Such tilting zone and tapered inner section of the transverse member allow adjacent transverse members to mutually tilt in a curved trajectory part of the drive belt in the transmission, while these adjacent transverse members remain in physical contact through, at least, an axially oriented contact line located in the tilting zone. It is noted that a ratio between respective radial positions of the said contact line between the transverse members at each transmission pulley determines the rotational speed ratio between these pulleys. It is further noted that, by the specific design of the transverse members according to FIG. 6 of EP-1219860-A, a range of transmission ratios between a largest transmission ratio and a smallest transmission ratio is favourably extended compared to the same transmission equipped with the drive belt according to FIG. 4 of EP-1219860-A. More in particular, in this latter drive belt design the largest radial position of the said contact line is limited by the requirement that the endless carrier, which is located somewhat radially outward of the said contact line, must be contained in axial direction (also) by the transmission pulleys. This requirement is, however, not applicable to the drive belt according to FIG. 6 of EP-1219860-A, wherein the endless carrier is fully contained in axial direction by the transverse members, i.e. by the respective pillar parts thereof.

On either axial side of the base part thereof, the transverse member is provided with contact surfaces for frictionally engaging a pulley sheave of the transmission pulleys. These pulley contact surfaces are mutually oriented at an angle, denoted the belt angle $\phi$, that matches, at least by approximation, an angle defined by and between the conical pulley sheaves of the pulleys, which latter angle is denoted the pulley angle. Furthermore, these pulley contact surfaces are either corrugated by a macroscopic profile or are provided with a rough surface structure, such that only the higher lying parts of the corrugation profile or the peaks of the surface roughness arrive in contact with the pulley sheave. This particular feature provides that the friction between the drive belt and the transmission pulleys is optimised by allowing cooling oil that is applied in the known transmission to be accommodated in the lower lying parts of the corrugation profile or the valleys of the surface roughness.

During operation in the transmission, the transverse members of the drive belt that are located between the pulley sheaves of a driving pulley of the transmission are driven in the direction of rotation thereof by friction forces being exerted by these pulley sheaves on the pulley contact surfaces of these transverse members. These latter, driven transverse members push preceding transverse members along the circumference of the endless carrier of the drive belt and, ultimately, rotationally drive the driven pulley of the transmission, again by friction. In order to generate such friction (force) between the transverse members and the pulley sheaves of the transmission pulleys, the pulley sheaves of a pulley are forced towards one another in axial direction, whereby these exert mutually opposed pinching force on the transverse members in the axial direction thereof.

In the art several requirements have been described in relation to a length L of the pulley contact surfaces, as defined along the general direction of divergence thereof. Obviously, at the very least, such length L must be sufficient for providing the required wear resistance to the pulley contact surfaces in terms of the desired service life of the drive belt. EP-0896171-A provides a technical analysis in this particular respect. Another requirement in relation to such length L is provided by EP-0367620-A. According to the geometric analysis underlying this latter document, such length L must be sufficient for forcing the transverse members to align with the pulley sheaves. More in particular, EP-0367620-A provides a design rule for promoting a line contact (as opposed to an edge contact) between the pulley contact surfaces of the transverse member and the pulley sheaves. In particular, this known design rule limits the freedom of the transverse member to rotate around an axis extending in circumference direction of the drive belt where it is located in between the pulley sheaves.

A further advantage of the drive belt according to FIG. 4 of EP-1219860-A is thus that the pulley contact surfaces thereof can be provided, at least in part, to the pillar parts. For a given required length L of the pulley contact surfaces, this allows for a small(-er) radial dimension of the base part. In the end, this design feature thus results in a small(-er) smallest radial position of the said contact line, such that the range of transmission ratios can be extended further.

In practice there is a limit to the part of the whole length L of the pulley contact surface that can be provided to the pillar part and thus to the minimum radial dimension of the base part. After all, the pinching force exerted by the pulleys on the transverse member is supported by the transverse members of the belt via their pulley contact surfaces. As an increasingly larger part of the pulley contact surfaces is located in the pillar parts, these will increasingly bend away from the pulley sheaves under influence of the pinching force, whereby the base part will be increasingly loaded by the pinching force anyway. Furthermore, such bending of the pillar parts can lead to failure of the drive belt.

SUMMARY OF THE INVENTION

It is an object of the present disclosure to extend, i.e. broaden the range of transmission ratios even further. According to the present disclosure, this object can be accomplished by optimising the drive belt, favourably without modification of the design and the mutual placement of the transmission pulleys. More in particular, a reconsideration of the known requirements in relation to the pulley contact surfaces, led to the novel and surprising insights in relation to the design of the transverse member of the drive belt.

The drive belt according to the present disclosure is defined in the set of claims that is attached hereto. In particular according to the present disclosure, the pulley contact surfaces on either side of a transverse member are provided in two distinct sections separated by a lower lying, non-pulley contacting surface of the respective transverse member that is provided there between, with a first one of the said two distinct sections at least partly provided in the base part and with a second one thereof provided in a respective pillar part of the respective transverse member. Depending on the position of the said first section of the pulley contacting surface, the non-pulley contacting surface is thus either partly or wholly provided in the pillar part.

With this design of the transverse member and for a given length L of the pulley contact surfaces, the share of the pinching force that is supported by the pillar parts is favourably reduced, at least in comparison with continuously formed pulley contact surfaces of equal length L. This novel embodiment of the transverse member is based on the consideration that, in practice, the length of the pulley contact surfaces that is required for providing (sufficient) wear resistance, can be considerably less than the length of the pulley contact surfaces that is required to promote the said line contact between the transverse member and the pulley sheaves. Hence, the pulley contact surface need not necessarily arrive in contact with the pulley sheaves along the entire length L thereof. Instead, it is found to be entirely permissible to provide the said non-pulley contacting surface in radial direction in-between the two sections of the pulley contact surface.

It is noted that by the provision of the corrugation thereof also the known pulley contact surface is provided with part that contact the pulleys, i.e. ridges, and parts that do not contact the pulleys, i.e. valleys. However, these valleys of the corrugation profile of the pulley contact surfaces are at least a factor of 2 smaller than the said non-pulley contacting surface thereof.

BRIEF DESCRIPTION OF THE DRAWINGS

A more detailed embodiment of the transverse members according to the present disclosure, as well as the general considerations underlying the present disclosure will, hereinafter, be elucidated further by way of example on the basis of the description below with reference to the drawing, in which.

DETAILED DESCRIPTION OF THE PREFERRED EMBODIMENTS

Figure 1:
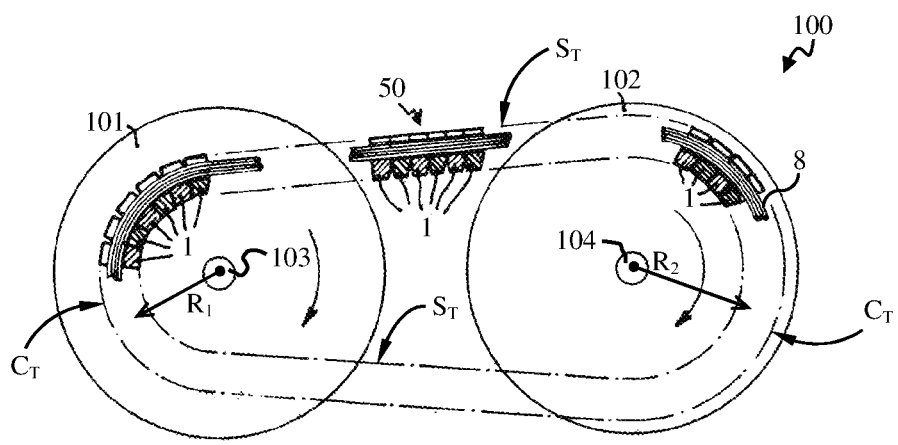
FIG. 1 is a simplified and schematic side elevation of a transmission with two pulleys and a drive belt.

FIG. 1 schematically shows the central parts of a continuously variable transmission 100 for use in a driveline of, for example, passenger motor vehicles. This transmission 100 is well-known per se and comprises at least a first variable pulley 101 and a second variable pulley 102. In the driveline, the first pulley 101 is coupled to and driven by an engine and the second pulley 102 is typically coupled to driven wheels of the motor vehicle via a number of gears.

Both transmission pulleys 101, 102 comprise a first conical pulley sheave that is fixed to a pulley shaft 103, 104 of the respective pulley 101, 102 and a second conical pulley sheave that is axially displaceable relative to the respective pulley shaft 103, 104 and that is fixed thereto only in rotational direction. A drive belt 50 of the transmission 100 is wrapped around the pulleys 101, 102, while being accommodated between the pulley sheaves thereof. As appears from FIG. 1, the trajectory of the drive belt 50 in the transmission 100 includes two straight sections $S_T$ and two curved sections $C_T$ where the drive belt 50 is curved around a respective one of the two transmission pulleys 101, 102.

During operation of the transmission 100, the drive belt 50 is pinched by and between the pulley sheaves of both pulleys 101, 102 and thus provides a rotational connection there between by means of friction. To this end, electronically controllable and hydraulically acting movement means that act on the respective moveable pulley sheave of each pulley 101, 102 are provided in the transmission 100 (not shown). In addition to exerting a pinching force on the drive belt 50, these movement means also control respective radial positions R1 and R2 of the drive belt at the pulleys 101, 102 and, hence, the transmission ratio provided between the pulley shafts 103, 104 of the transmission 100.

The known drive belt 50 is composed of an endless carrier 8 and a plurality of transverse members 1 that are mounted on the endless carrier 8 along the circumference thereof in an, at least essentially, contiguous row. In the drive belt 50 the transverse members 1 are movable along the circumference of the endless carrier 8, which endless carrier 8 is typically composed of a number of flexible metal rings or bands, which metal bands are stacked one around one another, i.e. are mutually nested.

Figure 2:
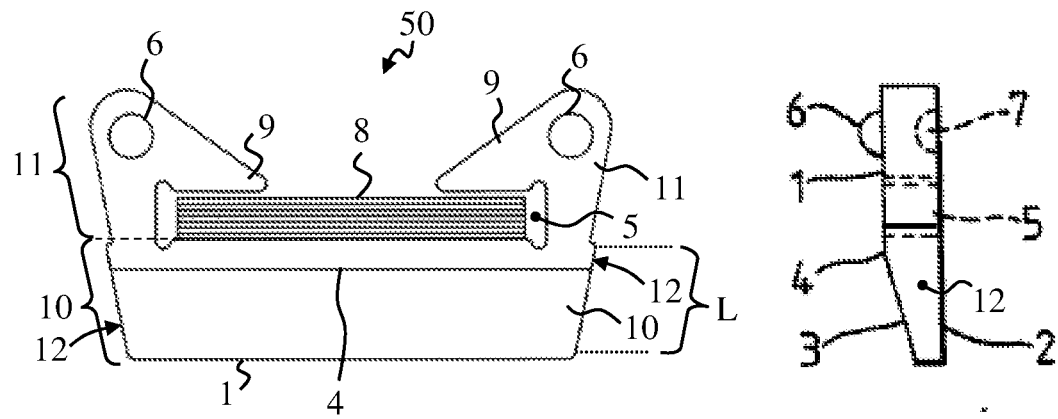
FIG. 2 schematically illustrates the known drive belt with generally V-shaped transverse members in a cross-section thereof facing in its circumference direction and also includes a separate side elevation of only the transverse member thereof.

In FIG. 2 the drive belt 50 is illustrated in one of many known embodiments thereof. On the left side of FIG. 2 the drive belt 50 is shown in cross-section and on the right side of FIG. 2 a side elevation of the drive belt 50 is included. From FIG. 2 it appears that the transverse members 1 of the drive belt 50 are generally shaped similar to the letter "V", i.e. are generally V-shaped, whereby an angle ϕ between the sides of the transverse members 1 is designed to closely match an angle that is present between the conical pulley sheaves of the transmission pulleys 101, 102.

Each transverse member 1 comprises a base part 10 and two pillar parts 11, whereof the base part 10 extends mainly in the axial direction of the drive belt 50 and whereof the pillar parts 11 extend mainly in the radial direction of the drive belt 50 from respective axial sides of the base part 10. In thickness direction, each transverse members 1 extends between a front main face 3 and a rear main face 2 thereof that are both oriented, at least generally, in the circumference direction of the drive belt 50. An opening 5 is defined between the pillar parts 11 and the base part 10 of each transverse member, wherein a small circumferential section of the endless carrier 8 is accommodated.

In the presently illustrated embodiment thereof, the pillar parts 11 of the transverse members 1 are each provided with a hook part 9 that extends in axial direction over the opening 5, whereby the endless carrier 8 is securely contained therein during operation of the drive belt 50 in the transmission 100. Furthermore, the pillar parts 11 of the transverse members 1 are each provided with a projection 6 that protrudes from the respective front main face 3 in, essentially, the said circumference direction. In the drive belt 50, the projection 6 is inserted in a recess 7 provided in the opposite, i.e. rear main face 2 of an adjacent transverse member 1 to limit a relative movement between the adjacent transverse members 1, at least in radial direction, but typically also in axial direction.

On the axial sides thereof, the transverse members 1 are each provided with contact surfaces 12 for contacting (the pulley sheaves of) the transmission pulleys 101, 102. In practice these pulley contact surfaces 12 are either corrugated or are provided with a rough surface structure, such that only the higher lying parts of the corrugation profile or the peaks of the surface roughness arrive in physical contact with the pulleys 101, 102.

In the art several requirements have been described in relation to a length L of the pulley contact surfaces 12, as defined along the general direction of divergence thereof. At the very least, such length L must be sufficient for providing the required wear resistance to the pulley contact surfaces, of course while taking into account that only a part of the overall surface area thereof, i.e. the higher lying parts or peaks thereof, actually arrived into contact with the pulley sheaves.

Another requirement in relation to such length L is that it must be sufficient for promoting the alignment of the transverse members 1 with respect to the pulley sheaves in radial direction. This design rule, known from EP-0367620-A, is as follows:

$$L \geq \sin(\frac{1}{2}\phi)*W$$

with W representing the largest dimension in axial direction, i.e. width, of the transverse member 1 where it is still in contact with the pulley sheaves, i.e. measured at a radially outer extent of the contact surfaces 12. The thus calculated minimum length L, effectively represents a maximum length L as well, however, for the sake of design freedom, some 25% larger value can normally be accepted as well, whereas a minimum margin of 10% is preferably applied to account for inaccuracies and wear:

$$1.25*(\sin(\frac{1}{2}\phi)*W) \geq L \geq 1.10*(\sin(\frac{1}{2}\phi)*W)$$

In the base part 10 thereof, the transverse members 1 are each provided with a so-called tilting zone 4. This tilting zone 4 represents an axially extending transition between a radially outer section of the respective transverse member 1 of essentially constant thickness and a radially inner section thereof that tapers in radial inward direction. Typically, the tilting zone 4 is incorporated as a smoothly convexly curved surface part of the front main face 3 of the respective transverse member 1. When adjacent transverse members 1 are tilted relative to one another in the curved section $C_T$ of the drive belt 50, these (can) remain in contact at the tilting zone 4.

Figures 3, 4:
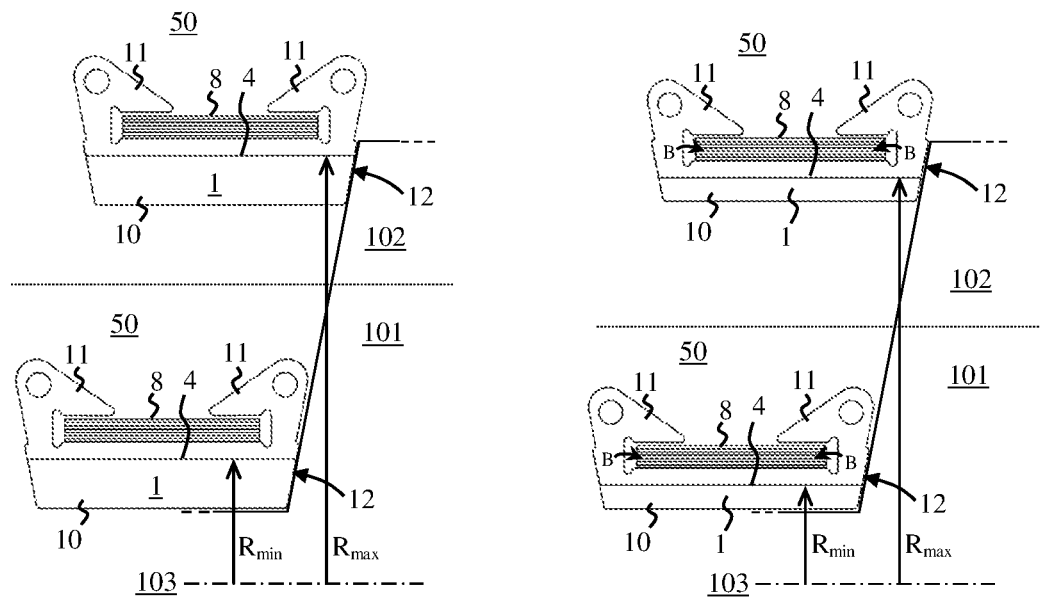
FIG. 3 schematically illustrates how the transmission ratio is defined by the interaction between the drive belt and the pulleys.
FIG. 4 schematically illustrates a known manner of influencing the most extreme transmission ratio of the transmission by the design of the drive belt, in particular of the transverse members thereof.

In FIG. 3 it is schematically illustrated how the ratio of the transmission is linked to the respective radial positions Rmax, Rmin of the drive belt 50 at the pulleys 101, 102. In particular, in FIG. 3, the drive belt 50 is shown in its smallest radial position Rmin at the first pulley 101 and in its largest radial position Rmax at the second pulley 102, such that the transmission 100 as a whole provides the most decelerating transmission ratio, called "Low" that corresponds to Rmax/Rmin with Rmax and Rmin numerically being determined by the radial position of the tilting zone 4 of the transverse members 1 of the drive belt 50 at the respective pulleys 101, 102. The total range of ratios or ratio coverage RC provided by the transmission 100 is defined by the product of such most decelerating transmission ratio and the most accelerating transmission ratio, which corresponds to, or at least can be approximated by, the square of the ratio Low. Practical values for Rmax and Rmin are 75 mm and 30 mm respectively, resulting in a most decelerating ratio LOW of 2.5 and a ratio coverage RC of approximately 6.3.

It is a general development aim in the design of the present type transmission 100 to maximise the ratio coverage RC thereof. In principle, this aim can be realised in the design of the drive belt 50, favourably without modification of the design of the pulleys 101, 102, by arranging the pulley contact surfaces 12 of the transverse members 1 thereof not only to the base part 10, but partly also to the pillar parts 11 thereof. This particular arrangement of the pulley contact surfaces 12 is shown in FIG. 4, again in relation to the respective radial positions Rmax, Rmin of the drive belt 50 at the pulleys 101, 102.

Because in the transverse member 1 of FIG. 4 the radial dimension or height of the base part 10 thereof is reduced relative to the transverse member 1 shown in FIG. 3, the transverse members 1 can be positioned closer to the pulley shaft 103. Thus the smallest radial position Rmin of the transverse members 1 at the first pulley 101, as determined by the tilting zone 4, can be favourably reduced by a corresponding amount. It is true that, as also shown in FIG. 4, the largest radial position Rmax of the transverse members 1 at the second pulley 102 reduces by a corresponding amount as a consequence, since in the embodiment of FIG. 4 the pulley contact surfaces 12 extend well into the pillar parts 11. However, the ratio between the smallest radial position Rmin and the largest radial position Rmax, i.e. ratio LOW and thus also the ratio coverage RC of the transmission 100, are favourably increased thereby. For example, if the above mentioned practical value for Rmax and Rmin are both reduced by 2 mm, the most decelerating ratio LOW increases from 2.5 to 2.6 and the ratio coverage RC increases from 6.3 to 6.8 approximately.

In the design of the transverse members 1 according to FIG. 4 a substantial portion of the pinching force is born by the pillar parts 11. However, since—in contrast with the base part 10—the pillar parts 11 are not supported in the axial direction, these pillar parts 11 will bend axially inwards to a certain extent, as schematically indicated by the arrows B in FIG. 4. This bending of the pillar parts 11 can, however, be accepted only to a very limited extent, since otherwise the pillar parts 11 might contact the endless carrier 8, causing excessive friction there between, or the pillar parts 11 might break off from the base part 10 due to bending stress fatigue. As a result, the pulley contact surfaces 12 of the transverse members 1 can, in practice, only be located in the pillar parts 11 to a limit extend, thus limiting the increase in ratio coverage RC that can be achieved thereby. In particular, the said values for Rmax and Rmin can only be reduced by 0.5 mm by such measure in practice. Thus limiting the increase in ratio coverage RC to 0.1 approximately, i.e. from 6.3 to 6.4 only.

Figure 5:
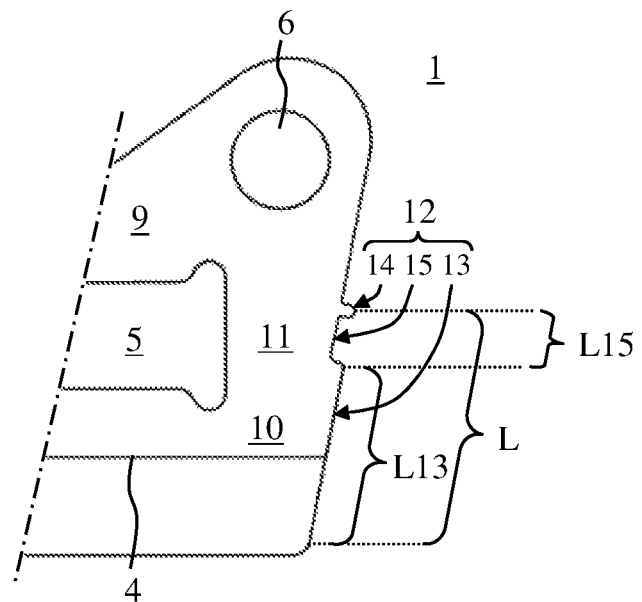
FIG. 5 schematically illustrates the novel transverse member according to the present disclosure.

The present disclosure, however, proposes a novel design for the transverse members 1 that is illustrated in FIG. 5 that provides for an improvement of the achievable ratio coverage RC without the pillar parts 11 of the transverse members 1 thereof bending excessively. In this novel transverse member 1 the pulley contact surfaces 12 on either side of the transverse member 1 are provided in two distinct sections 13 and 14 separated by a lower lying, non-pulley contacting surface 15 that is provided there between, with a first section 13 provided partly in the base part 10 and with a second section 14 provided wholly in a respective pillar part 11 of the respective transverse member 1. In particular, the length L13 of the first section 13 of the pulley contact surfaces 12 is chosen such that the criterion of wear resistance is satisfied, i.e. that the desired service life of the drive belt 50 is obtained in terms of wear of these pulley contact surfaces 12. EP-0896171-A mentions a minimum of 3.8 mm in relation to L13.

Furthermore, according to the present disclosure, the overall length L of the pulley contact surfaces 12 must still satisfy the known criterion for promoting a line contact (as opposed to an edge contact) between the pulley contact surfaces of the transverse member 1 and the pulley sheaves. For a transverse member 1 with a width W of 24 mm and an angle φ of 22 degrees, this overall length L can be calculated with the afore-mentioned equation to a value in the range from 4.5 to 5.2 mm.

With the novel design of the transverse members 1 of FIG. 5, the friction between the drive belt and the transmission pulleys 101, 102 along the circumferential direction concentrates in the said first section 13 of the pulley contact surfaces 12, whereas the said second section 14 blocks the rotation of the transverse members 1 about the axial direction, as desired.

Figure 6:
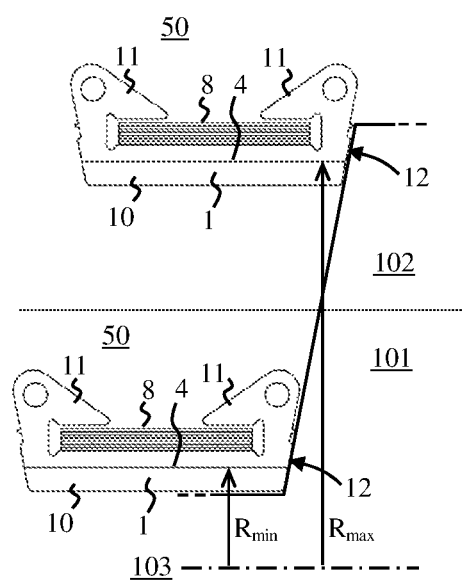
FIG. 6 schematically illustrates the novel transverse member interacting with the transmission pulleys.

With the novel design of the transverse member 1 of FIG. 5 and for a given length L of the pulley contact surfaces 12, the share of the pinching force that is supported by the pillar parts 11 is favourably reduced, at least in comparison with continuously formed pulley contact surfaces 12 of equal length L shown in FIG. 4. Therefore, the novel design of the transverse members 1 of FIG. 5 enables the pulley contact surfaces 12 to extend well into the pillar parts 11 without the axial bending thereof, due to the application of the pulley pinching force, becoming excessive. Hence, as illustrated in FIG. 6, the above mentioned increase of the ratio coverage RC from 6.3 to 6.8 can become feasible after all.

Preferably, but not necessarily, the said second section 14 of the pulley contact surface 12 provides only a single point of contact with the pulley sheaves. Hereby the axial and tangential forces on the pillar parts 11 are favourably made small.

Preferably, but not necessarily, the said first section 13 of the pulley contact surface 12 is provided wholly in the base part 10 of the transverse members 1. Hereby the axial and tangential forces on the pillar parts 11 are favourably made small.

In a practical embodiment of the above-mentioned novel transverse members 1, a length L15 of the non-pulley contacting surface 15 amounts to between 10 and 50%, preferably 20 to 40%, of the said length L13 of the first section 13 of the pulley contact surfaces 12. For the currently commercial applied designs of the drive belt 50, this latter requirement amounts to a length L15 of the non-pulley contacting surface 15 of approximately 0.5 to 2.5 mm in absolute terms.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. A transverse member (1) for a drive belt (50) to operate with an endless carrier (8), the transverse member (1) comprising:
   a base part (10); and
   two pillar parts (11),
   wherein said pillar parts (11) respectively extend in height direction from respective sides of the base part (10), and
   wherein said transverse member (1) on both sides thereof is provided with a respective contact surface (12) for arriving in friction contact with pulleys (101, 102) of a transmission (100) that is provided with the drive belt (50),
   wherein both contact surfaces (12) of the transverse member (1) are each individually divided in a height direction into two distinct sections (13, 14) separated by a lower lying surface (15) of the transverse member (1),
   wherein said lower lying surface (15) does not arrive in contact with the pulleys (101, 102) in the transmission (100),
   wherein a first (13) of said two sections (13, 14) of both contact surfaces (12) is located in the base part (10) of the transverse member (1), extending over a full dimension thereof in the height direction, which first (13) of said two sections (13, 14) of both contact surfaces (12) is provided with a surface profile with peaks and valleys, whereof only the peaks arrive in contact with the pulleys (101, 102) in the transmission (100),
   wherein a second (14) of said two sections (13, 14) of both contact surfaces (12) is wholly provided in a respective pillar part (11) of the transverse member (1),
   wherein a dimension in the height direction of each of the lower lying surfaces (15) of the transverse member (1) is larger than a dimension of the valleys of the surface profile by a factor of at least 2, and wherein the second (14) of said two sections (13, 14) of both contact surfaces (12) are each provided in a single point of contact with the pulleys (101, 102) in the transmission (100).

2. The transverse member (1) according to claim 1, wherein a dimension in the height direction of the lower lying surfaces (15) of the transverse member (1) amounts to between 10% and 50% of a dimension of the first (13) of said two sections (13, 14) of the contact surfaces (12) in the height direction.

3. The transverse member (1) according to claim 1, wherein a combined dimension in the height direction of said two sections (13, 14) of a respective contact surface (12) and of the lower lying surface (15) of the transverse member (1) that is respectively provided therebetween has a value between $1.10*(\sin(\frac{1}{2}\phi)*W)$ and $1.25*(\sin(\frac{1}{2}\phi)*W)$,
- wherein ϕ is an angle defined by and between both contact surfaces (12) of the transverse member (1), and
- wherein W is a dimension in a width direction of the transverse member (1) between and at the location of the second (14) of said two sections (13, 14) of the contact surfaces (12).

4. The transverse member (1) according to claim 2, wherein a combined dimension in the height direction of said two sections (13, 14) of a respective contact surface (12) and of the lower lying surface (15) of the transverse member (1) that is respectively provided therebetween has a value between $1.10*(\sin(\frac{1}{2}\phi)*W)$ and $1.25*(\sin(\frac{1}{2}\phi)*W)$,
- wherein ϕ is an angle defined by and between both contact surfaces (12) of the transverse member (1), and
- wherein W is a dimension in a width direction of the transverse member (1) between and at the location of the second (14) of said two sections (13, 14) of the contact surfaces (12).

5. A transverse member (1) for a drive belt (50) to operate with an endless carrier (8), the transverse member (1) comprising:
- a base part (10); and
- two pillar parts (11),
- wherein said pillar parts (11) respectively extend in height direction from respective sides of the base part (10), and
- wherein said transverse member (1) on each of opposing sides thereof is provided with a contact surface (12) configured to come into friction contact with pulleys (101, 102) of a transmission (100),
- wherein each one of the contact surfaces (12) consists of two sections (13, 14) that are separated from one another in a height direction by a lower lying surface (15) that does not come into contact with the pulleys (101, 102) of the transmission (100),
- wherein, for both contact surfaces, a first (13) of the two sections (13, 14) is located in the base part (10) of the transverse member (1) and extends over a full dimension thereof in the height direction, said first (13) of the two sections (13, 14) provided with a surface profile with peaks and valleys whereof only the peaks arrive in contact with the pulleys (101, 102) of the transmission (100),
- wherein, for both contact surfaces, only a second (14) of the two sections (13, 14) is located entirely in a respective pillar part (11) of the transverse member (1),
- wherein a dimension in the height direction of the lower lying surfaces (15) is larger than a dimension of the valleys of the surface profile by a factor of at least 2, and
- wherein the second (14) of the two sections (13, 14) presents only a single point of contact with the pulleys (101, 102) in the transmission (100).

6. The transverse member (1) according to claim 5, wherein a dimension in the height direction of the lower lying surfaces (15) of the transverse member (1) amounts to between 10% and 50% of a dimension of the first (13) of the two sections (13, 14) of the contact surfaces (12) in the height direction.

7. The transverse member (1) according to claim 5, wherein a combined dimension in the height direction of said two sections (13, 14) of a respective contact surface (12) and of the lower lying surface (15) of the transverse member (1) that is respectively provided therebetween has a value between $1.10*(\sin(\frac{1}{2}\phi)*W)$ and $1.25*(\sin(\frac{1}{2}\phi)*W)$,
- wherein ϕ is an angle defined by and between both contact surfaces (12) of the transverse member (1), and
- wherein W is a dimension in a width direction of the transverse member (1) between and at the location of the second (14) of said two sections (13, 14) of the contact surfaces (12).

* * * * *